Figure 1:
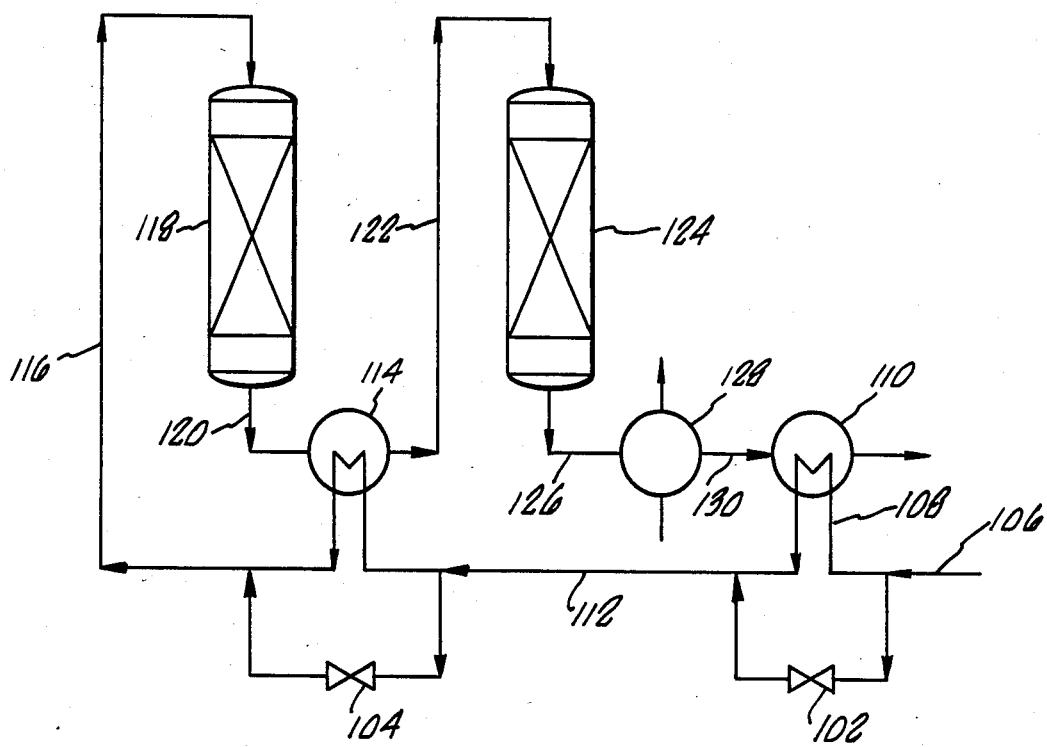

United States Patent [19]

Grotz

[11] Patent Number: 4,744,966
[45] Date of Patent: May 17, 1988

[54] PROCESS FOR SYNTHESIZING AMMONIA

[75] Inventor: Bernard J. Grotz, Pasadena, Calif.

[73] Assignee: Santa Fe Braun Inc., Alhambra, Calif.

[21] Appl. No.: 932,614

[22] Filed: Nov. 20, 1986

[51] Int. Cl.⁴ .............................................. C01C 1/04
[52] U.S. Cl. ..................................... 423/360; 423/361
[58] Field of Search ................. 423/360, 361; 422/148

[56] References Cited

U.S. PATENT DOCUMENTS

| | | | |
|---|---|---|---|
| 3,851,046 | 11/1974 | Wright et al. | 423/359 |
| 4,181,701 | 1/1980 | Topsoe et al. | 423/360 |
| 4,213,954 | 7/1980 | Pinto | 422/148 |
| 4,510,123 | 4/1985 | Grotz | 423/360 |
| 4,518,574 | 5/1985 | Osman et al. | 423/361 |
| 4,624,842 | 11/1986 | Grotz | 423/360 |

Primary Examiner—John Doll
Assistant Examiner—Wayne A. Langel
Attorney, Agent, or Firm—Lyon & Lyon

[57] ABSTRACT

Means are disclosed for lowering the temperature of the gaseous effluent from the first catalyst bed in a continuous ammonia synthesis process in which a syngas mixture containing nitrogen and hydrogen is passed sequentially over two or more catalyst beds containing ammonia synthesis catalyst. This cooling, effected to promote the exothermic ammonia-forming reaction, is accomplished by subjecting the gaseous effluent from the first catalyst bed to heat exchange in a steam superheater, preferably after having undergone heat exchange with the synthesis gas feed to the first catalyst bed, to control the temperature of the effluent entering the second catalyst bed to a desired level.

10 Claims, 2 Drawing Sheets

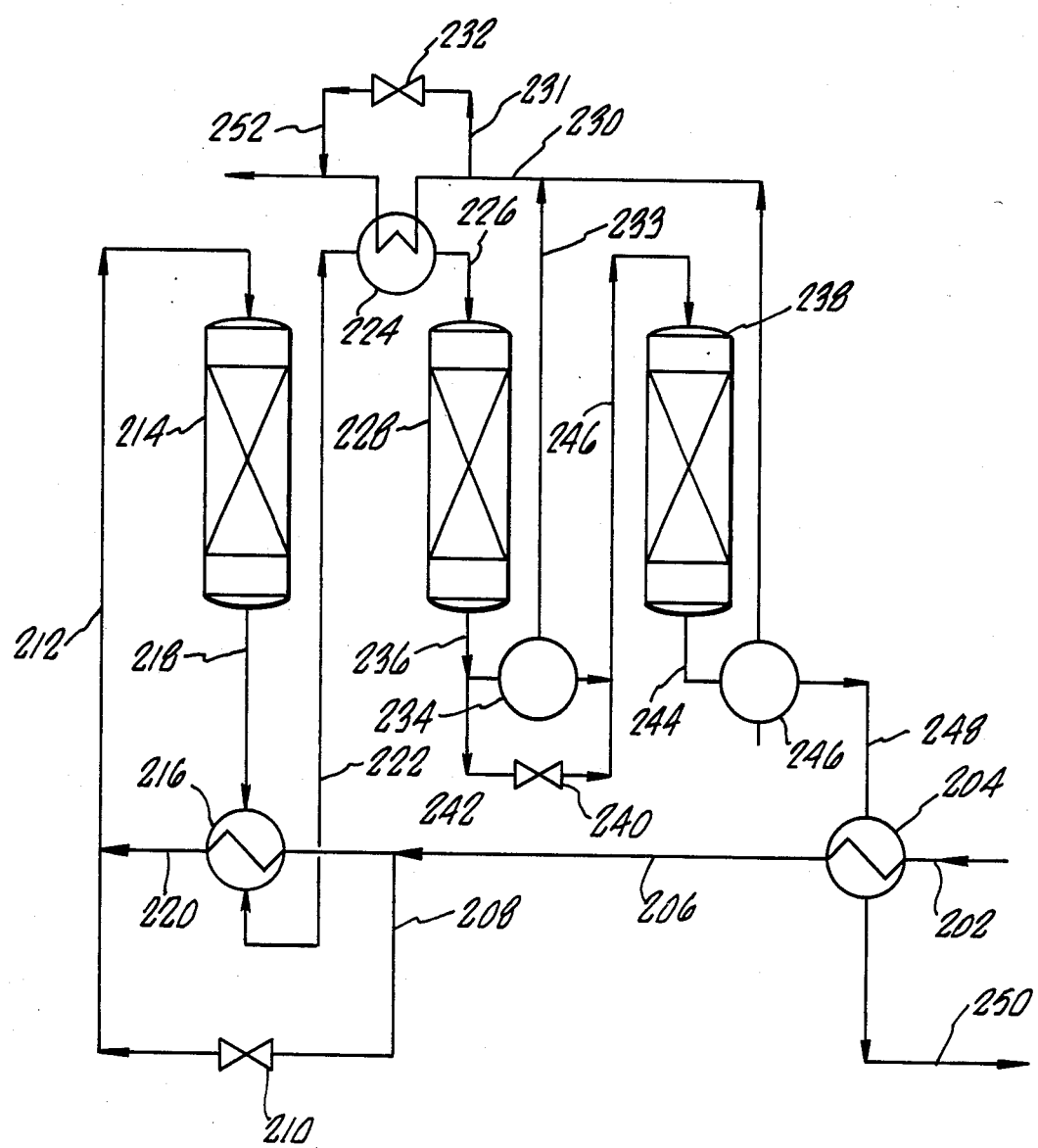
FIG_2_

PROCESS FOR SYNTHESIZING AMMONIA

BACKGROUND OF THE INVENTION

1. Field of the Invention

This invention relates to the synthesis of ammonia. More particularly, this invention relates to a novel continuous process for producing ammonia which provides a more efficient and less costly means of controlling the temperature at which the synthesis reaction is carried out. This in turn provides more efficient heat recovery, using less heat exchanger surface area, and higher conversions of synthesis gas to ammonia than hithertopracticed ammonia synthesis processes.

2. Description of the Prior Art

Ammonia is produced commercially today by continuous processes which involve the seemingly straightforward reaction between stoichiometric amounts of nitrogen and hydrogen:

$$N_2 + 3H_2 \rightarrow 2NH_3.$$

In practicing such processes, a gaseous mixture containing nitrogen and hydrogen is passed sequentially over two or more catalyst beds containing, for example, finely divided iron or promoted iron catalyst, at relatively high pressure and controlled temperature.

The reaction is exothermic, hence, the equilibrium will be shifted to the right as the reaction temperature is lowered. As a practical matter however the reaction temperature must be maintained at a sufficiently elevated level to permit the synthesis of acceptable quantities of product in a reasonably short time. This is true even though a catalyst is customarily employed to accelerate the reaction rate. Thermodynamic considerations also militate in favor of the ammonia-producing reaction's being carried out at high pressures; collisons between nitrogen and hydrogen gas molecules are necessary to effect the synthesis. Consequently, the process is conventionally carried out at pressures of over 100 atmospheres, although it has been disclosed in the prior art that processes of this general type can be practiced at pressures as low as 20 atmospheres; see, for example, U.S. Pat. No. 3,368,869; 4,153,673; 4,163,775; 4,250,057 and 4,271,136.

As can be seen, then, an appropriate balance must be struck between thermodynamic, kinetic and economic considerations when determining the conditions —particularly temperature —at which a commercially attractive ammonia synthesis will be carried out.

A typical prior art process for synthesizing ammonia —for example that disclosed in Wright et al U.S. Pat. No. 3,851,046 or in Grotz U.S. Pat. No. 4,510,123 —involves:

(a) heating synthesis gas containing nitrogen and hydrogen in roughly stoichiometric amounts to a proper temperature level, (b) passing this gas over two or more catalyst beds in series, these beds containing, for example, iron or promoted iron catalyst, to produce a reactor effluent which is at a higher temperature than the original synthesis gas mixture due to the exothermic nature of the reaction and which contains some percentage of ammonia, representing for example 15 to 35% of the total volume of the reactor effluent, and (c) cooling this reactor effluent to recover heat for various uses in the plant and to prepare the effluent for further processing to separate ammonia from unreacted hydrogen, nitrogen, and any inert diluent(s) present.

Ordinarily, the temperature of the gas emerging from the first and any subsequent catalyst beds is sufficiently high to be thermodynamically inhibitory to further ammonia-forming reaction. Therefore, the effluent from one catalyst bed must be cooled if it is to be passed through another cataylst bed to increase the percentage conversion of the synthesis gas to ammonia. Temperature regulation is thus of prime importance to the efficiency of multiple catalyst bed ammonia synthesis processes.

Apparatus in which the Wright et al patent's process can be carried out is illustrated schematically in FIG. 1 attached hereto; bypass valves 102 and 104 in FIG. 1 are not specifically disclosed in the Wright et al patent, but have been included for reasons discussed hereinbelow.

With reference to FIG. 1, fresh syngas introduced through a conduit 106 is passed through a conduit 108 to a heat exchanger 110 and heated therein to a temperature of 280° C. The thusheated syngas is then passed through a conduit 112 to a second heat exchanger 114 and heated therein to a temperature of 400° C. The high temperature syngas is then passed through a conduit 116 to a catalytic converter 118 in which the exothermic ammonia-forming reaction causes the temperature to rise to about 520° C. The partially converted gas exiting the catalytic converter 118 through a conduit 120 is then cooled in the second heat exchanger 114 to a temperature of about 400° C., then passed through a conduit 122 to a second catalytic converter 124, where again the conversion of hydrogen and nitrogen to ammonia results in a temperature rise in the stream, this time to about 480° C. Effluent from the second catalytic converter 124 passes through a conduit 126 to a steam generator or superheater 128, and is cooled to about 320° C. by generating high pressure steam in the steam generator 128. The thus-cooled stream is then passed through a conduit 130 and further cooled by heat exchange with fresh syngas in the first heat exchanger 110.

Temperature regulation in such a process could be accomplished by use of the added bypass valves 102 and 104. There are, however, limitations to the effectiveness of this means of temperature control. For a given temperature in the conduit 112, if the bypass valve 104 is opened to cause a lower temperature in the conduit 116, the conversion in the first catalytic converter 118 would increase, causing an increased effluent temperature in the gas exiting the first catalytic converter through the conduit 120. Since opening the bypass valve 104 would also result in less cooling of the effluent from the first catalytic converter 118 in the second heat exchanger 114, the temperature of the gas entering the second catalytic converter 124 through the conduit 122 would increase, resulting in a decrease in conversion in the second catalyst bed. Thus, the overall conversion achieved in the first and the second catalyst beds would remain the same as it was before the valve 104 was opened.

To decrease the temperature of the gaseous reactants in the conduit 122 and the second catalytic converter 124, a bypass valve 102 would have to be used. Opening the bypass valve 102 would decrease catalytic converter inlet temperatures, resulting in higher conversions. Higher conversions in turn would permit a lower synthesis pressure, resulting in savings in steam consumption in the turbine that drives the synthesis gas compressor or any other compressor in the plant. These savings would be offset, however, by the loss of steam production from the steam generator as a result of the lower temperature of the gas exiting the catalytic converter 124. Thus, opening the bypass valve 102 would have the disadvantage of reducing overall heat recovery.

U.S. Pat. No. 4,510,123 discloses a three or more catalyst bed ammonia synthesis system in which the temperature of the first bed is regulated by heat exchange between the effluent of the first bed and fresh syngas and the temperatures of subsequent beds are regulated by high pressure steam generation. The use of additional catalyst beds permits higher conversions to ammonia. However, the first two beds of this three or more bed system are subject to the same temperature control limitations as described above for the process of the Wright et al patent.

Some prior art ammonia processes, for example, those described in the booklet "Topsoe S-200 Ammonia Synthesis Process", Aug. 1985, recover heat from the final catalytic converter bed by first generating high pressure steam and also heating boiler feed water. This method achieves efficient temperature regulation in all the catalyst beds, but has the disadvantages of adding pressure drop in the synthesis loop, adding the capital cost of an additional heat exchanger, and requiring the use of cold boiler feed water, which may not be available.

Another prior art means of controlling temperature during ammonia synthesis is by the use of "quench" type processes, in which effluent from one catalyst bed is mixed with "cold" fresh synthesis gas, thus lowering the temperature of the mixture entering the next catalyst bed to the proper level. While quenching may be repeated for as many beds as desired, obviously not all of the synthesis gas will pass through all of the catalyst beds, and each quench reduces the amount of high pressure steam that can be generated.

U.S. Pat. No. 4,230,680 describes a three bed process for producing ammonia from syngas in which temperature is controlled by passing a portion of the effluent from each of the three catalyst beds through heat exchangers to which all or a portion of the fresh syngas is also fed to provide a heat sink. Effluent from the third bed is cooled by "various plant fluid(s)","such as boiler feed water". If boiler feed water or other such cooling fluid is used, higher ammonia conversions in the first two beds can be achieved than are achievable in the processes previously discussed. But since no high pressure steam is generated, much less heat recovery is achieved. And, if effluent heat is used to generate steam instead of to heat boiler feed water, ammonia conversions are limited as in the previously discussed processes.

U.S. Pat. No. 4,215,099 to Pinto et al discloses a process for producing ammonia or methanol in which the synthesis gas fed to the first catalyst bed is in heat exchange with a coolant, preferably feed synthesis gas, and the second catalyst bed is adiabatic. This system is said to give a higher conversion to ammonia in the first catalyst bed, but does so with reduced heat recovery.

U.S. Pat. No. 4,213,954 discloses an ammonia synthesis in which steam is superheated in the synthesis section of the process to better control steam rates in the event of shutdown of the synthesis section, i.e., to avoid overheating steam superheaters in the synthesis gas generating section of the process. This process is operated at a synthesis pressure under 150, and preferably 40-80, bar abs, positions the steam superheater so that it will cool reacted gas before this gas is cooled by any other heat exchange, and achieves 15-30% or more of the total plant steam superheating.

The need exists, therefore, for a continuous process for producing ammonia which provides, in an economical manner, efficient temperature control, heat recovery and catalyst utilization with no sacrifice in yield of recoverable product.

It is an object of this invention to provide a novel continuous process for synthesizing ammonia.

It is also an object of this invention to provide a novel continuous process for synthesizing ammonia in which the temperature at which ammonia synthesis is carried out is controlled in a more efficient and less costly fashion than in known prior art ammonia synthesis processes.

Another object of this invention is to provide a novel continuous process for synthesizing ammonia in which the manner in which the ammonia synthesis reaction temperature is controlled provides more efficient heat recovery, using less heat exchanger surface area, and higher conversions of synthesis gas to ammonia than hitherto-practiced ammonia synthesis processes.

These and other objects, as well as the nature, scope and utilization of the invention, will become readily apparent to those skilled in the art from the following description, the drawings and the appended claims.

SUMMARY OF THE INVENTION

In practicing the process of this invention—a continuous ammonia synthesis in which a synthesis gas mixture containing nitrogen and hydrogen is passed sequentially over two or more catalyst beds containing ammonia synthesis catalyst at relatively high pressure and controlled temperature—the temperature of the gaseous effluent from the first catalyst bed is regulated, i.e., lowered, before this effluent enters the next such catalyst bed, by passing this effluent through a steam superheater to effect cooling by heat exchange in the steam superheater. Prior to being cooled in the steam superheater, the gaseous effluent from the first catalyst bed can undergo a partial reduction in temperature by being subjected to heat exchange with the synthesis gas mixture being fed to the first catalyst bed.

The temperature of the gaseous effluents from the second and subsequent catalyst beds can likewise be lowered to whatever extent necessary to provide optimum conversion of nitrogen and hydrogen to ammonia before such effluents enter succeeding catalyst beds in any convenient manner, e.g., by heat exchange in a high pressure steam generator.

In contrast to the process disclosed in U.S. Pat. No. 4,213,954 in which, as mentioned above, a steam superheater is used to cool reacted gas before such gas is cooled by any other heat exchange, the process of the present invention uses a steam superheater:

preferably positioned to effect heat exchange after the partially reacted synthesis gas has been subjected to an initial heat exchange, primarily to regulate the temperature of the partially reacted synthesis gas, and control the temperature of this gas entering the second catalytic converter to a desired level, to effect less than 15 percent of the total plant steam superheating, in an ammonia synthesis process which is preferably carried out at a pressure of greater than 100 bar abs.

As used herein, the terms "syngas" and "synthesis gas" refer to a mixture of nitrogen and hydrogen, preferably in an approximate molar ratio of 1:3 respectively, which may also contain inert diluents such as argon, helium, methane or the like. While it is desirable to have zero diluent concentration, this is seldom achieved, and the syngas feed, although preferably composed substantially of hydrogen and nitrogen in an approximately stoichiometric ratio, may contain the same amounts of inert diluent(s) as prior art ammonia processes, inasmuch as the process of this invention is affected by the presence of inert diluents in essentially the same manner as are such prior art processes. Further, the approximate stoichiometric ratio of nitrogen to hydrogen in the gaseous feed to the process of this invention can range from about 1:2 or less to about 1:4 or higher without substantial detriment to the yields of ammonia achievable.

The term "final product effluent" refers to a gas stream which has passed through the entire reaction, i.e., through however many catalyst beds are employed, and which is to be subjected to known recovery processes to extract the ammonia therefrom.

Catalysts which can be used to accelerate the synthesis of ammonia are well known in the art. Included among such catalysts are finely divided iron and promoted iron catalysts. Presumably the discovery of a superior catalyst which would accelerate the reaction sufficiently so that it would proceed at an acceptable rate at, for example, a temperature of from about 300° C. to about 360° C., would alter the preferred reaction temperatures recited hereinbelow at which the process of the present invention will be practiced. The general principle on which the process of the present invention rests would not, however, be altered by the substitution of such improved catalysts, should they become known. Of course, the preferred temperature ranges would be correspondingly lowered if such better catalysts were used.

In order to promote rather than retard the ammonia-forming reaction in the first and subsequent catalyst beds, the syngas feed to the first catalyst bed and the effluents from this first and subsequent catalyst beds which will be fed to succeeding catalyst beds in a sequence of catalytic reactors should be at a temperature of not more than about 430° C., and preferably at a temperature within the range of from about 370° C. to about 420° C.

A variety of designs for apparatus in which the process of the present invention can be carried out are, in general, also well known in the art. Two major known types of catalytic converters for ammonia synthesis are radial flow converters and axial flow converters. In the former, the synthesis gas flows radially through the catalyst bed. In the latter, the synthesis gas flows downwardly or axially through the catalyst bed. However, the pattern of gas flow through the catalytic converter is not critical to the process of this invention.

Adiabatic catalytic converters are disclosed as being useful in the process of this invention. However, the first catalytic converter used in the process could also be a quench type converter, and would also preferably be followed by a feed effluent heat exchanger and a steam superheater.

No matter how many catalytic beds are employed, it is impracticable to obtain complete conversion of synthesis gas to ammonia. Typically, the first catalyst pass results in a conversion of from about 15 to 20% of the starting materials to ammonia, with succeeding passes resulting in further conversions. By employing the process of the present invention using only three catalytic converters in series, the final product effluent should contain approximately 20% ammonia by volume, which represents an approximately 30-35% conversion of the nitrogen starting material.

With reference to FIG. 2, syngas, as purified as possible, enters the system from a source (not shown) through a conduit 202 and is passed through a first heat exchanger 204 in which the heat source is the final product effluent which enters the heat exchanger 204 through a conduit 248. The syngas which has been thus heated, preferably to a temperature of from about 250° C. to about 320° C., is then passed through a conduit 206 and divided using a bypass control line 208 having a valve 210, so that a portion of the syngas passes directly by way of the bypass control line 208 and the valve 210 to a conduit 212 leading to a first catalytic converter 214, and the other portion passes through the conduit 206 to a heat exchanger 216, where it is used to cool the effluent passing through a conduit 218 from the first catalytic converter 214, resulting in the temperature of this portion of the feed syngas being raised. The effluent from the heat exchanger 216 is combined at a conduit 220 with the syngas from the bypass control line 208 which has passed through the valve 210, and the mixture is fed through the conduit 212 to the first catalytic converter 214. The temperature of the combined gasses as they enter the first catalytic converter 214 is, as indicated above, preferably between about 370° C. and about 420° C. In passing through the catalytic converter 214, a portion of the nitrogen and hydrogen is converted to ammonia in an exothermic reaction such that the temperature of the gas exiting the first catalytic converter 214 through a conduit 218 is between about 480° C. and about 540° C. The effluent is cooled in the heat exchanger 216 by heat exchange with the feed syngas so that the temperature of the effluent exiting the heat exchanger 216 through a conduit 222 is preferably between about 390° C. and about 440 ° C.

The conduit 222 carries the effluent exiting the heat exchanger 216 to a steam superheater 224, where this effluent is further cooled by providing heat to at least a portion of the steam which has been generated in the high pressure steam generators 234 and 246. Control of the gas temperature in a conduit 226, before the feed gas enters a second catalytic converter 228, is maintained by a bypass line 231, controlled by a valve 232 which controls the amount of cooling steam passing through the conduits 233 and from the high pressure steam generator 234. The gas entering the second catalytic converter 228 is preferably at a temperature between about 370° C. and 420° C. Further converstion to ammonia takes place in the second catalytic converter 228, with generation of sufficient heat to provide an effluent with an exit temperature of from about 450° C. to about 510° C. This effluent gas exiting the second catalytic converter 228 through a conduit 236 is cooled in the high pressure steam generator 234 to a temperature of from about 370° C. to about 420° C., the preferred temperature for the pass over the catalyst bed in a third catalytic converter 238. Control over this process variable is maintained by a control valve 240 in a bypass line 242, the fraction of gas bypassing the steam high pressure generator 234 being sufficient to retain the proper high temperature. Similarly, the reaction taking place in the third catalytic converter 238 involving feed gas passed through a conduit 246 to this converter results in an increase in temperature of the flowing gas mixture so that the temperature of the gas entering the high pressure steam generator 246 through a conduit 244 is from about 420° C. to about 480° C.

In the high pressure steam generator 246, the gas is cooled to a temperature of from about 300° C. to about 400° C. The gas emerging from the high pressure steam generator 246 is passed through a conduit 248 to the heat exchanger 204 to heat the original feed syngas to a temperature of from about 250° C. to about 320° C. The final product effluent which exits the heat exchanger 204 through a conduit 250 is then subjected to a conventional ammonia recovery process.

The high pressure steam generated in high pressure steam generators 234 and 246 is combined in the conduit 230. The combined flowing steam is then divided so that a portion of it is heated in the steam superheater 224 to a temperature of from about 320° C. to about 400° C., while the other portion of the high pressure steam passes through the valve 232 and the conduit 252 to other parts of the plant.

In the above described preferred embodiment of this invention three catalytic converters are used. However, the invention is not limited to this number of converters. For example, a two catalyst bed system could be employed, in which case the catalytic converter 238, the high pressure steam generator 234 with its generated steam, and the valve 240 would not be included, and effluent from the catalytic converter 228 would go directly to the high pressure steam generator 246.

The preferred embodiment also uses steam generated in the high pressure steam generators 234 and 246 to cool the feed to the second catalytic converter 228 in the steam superheater 224. However, the invention is not limited to using steam generated in the ammonia synthesis portion of the ammonia plant in the steam superheater 224; steam generated anywhere else in the plant may also be used.

In order that those skilled in the art can more fully understand this invention, the following example is set forth. This example is given solely for purposes of illustration, and should not be considered as expressing limitations unless so set forth in the appended claims.

EXAMPLE

With reference to FIG. 1, a continuous feed gas stream made up of:

| Component | Kg Moles/Hour |
|---|---|
| Hydrogen | 20,333 |
| Nitrogen | 6,692 |
| Ammonia | 939 |
| Argon[1] | 932 |
| Helium[1] | 259 |

[1]Argon and helium flow remain substantially constant.

is introduced at 155 bar pressure and a temperature of 51° C. through the conduit 202. The temperature of this gas stream after it passes through the heat exchanger 204 is 281° C. The temperature of the gas stream after passing through the heat exchanger 234 and being recombined with the portion of the gas stream recirculated through the bypass valve 210 is 393° C.

The gas stream is then passed to a first catalytic converter 214, where partial conversion of its nitrogen and hydrogen content to ammonia occurs. This first catalytic converter is a cylindrical vessel whose inside diameter is 3 meters and whose length is 3.44 meters, containing approximately 22 cubic meters of iron oxide ammonia synthesis catalyst.

The gas stream exiting the first catalytic converter is at a temperature of 516° C. and has the following composition, exclusive of argon and helium:

| Component | Kg Moles/Hour |
|---|---|
| Hydrogen | 17,346 |
| Nitrogen | 5,696 |
| Ammonia | 2,930 |

This represents a conversion at this point of approximately 15% of the amount of nitrogen in the initial feed gas stream to ammonia.

The gas stream exiting the first catalytic converter is passed through a heat exchanger 216 where it attains a temperature of 403° C., and then through a steam superheater 224 to decrease its temperature, upon exiting the superheater, to 380° C. The partially converted gas stream is then passed to a second catalytic converter 228, a cylindrical vessel whose inside diameter is 3.35 meters and whole length is 7.72 meters, containing approximately 58 cubic meters of iron oxide ammonia synthesis catalyst.

The gas stream exiting the second catalytic converter is at a temperature of 467° C. and has the following composition, again exclusive of argon and helium:

| Component | Kg Moles/Hour |
|---|---|
| Hydrogen | 15,228 |
| Nitrogen | 4,991 |
| Ammonia | 4,342 |

This represents a conversion at this point of approximately 25% of the amount of nitrogen in the initial feed gas stream to ammonia.

A portion of the gas stream exiting the second catalytic converter is passed through a high pressure steam generator 234. The effluent from this high pressure steam generator when combined with the other portion of the gas stream exiting the second catalytic converter which is circulated through a bypass valve 240, is at a temperature of 380° C. when it enters a third catalytic converter 238. This third catalytic converter, a cylindrical vessel whose inside diameter is 3.35 meters and whose length is 7.72 meters, contains 68 cubic meters of iron oxide ammonia synthesis catalyst.

The gas stream exiting the third catalytic conveter is at a temperature of 436° C. and has the following composition, again exclusive of argon and helium:

| Component | Kg Moles/Hour |
|---|---|
| Hydrogen | 13,906 |
| Nitrogen | 4,550 |
| Ammonia | 5,224 |

This represents a conversion at this point of approximately 32% of the amount of nitrogen in the initial feed gas stream to ammonia. The temperature of the gas stream exiting the third catalytic converter is then lowered to 318° C. by passing it through a high pressure steam generator 246, and then to 73° C. (as it exits through a conduit 250 as final product effluent) by passing it through a heat exchanger 204.

The final product effluent is then passed to the plant's recovery process section to extract the ammonia therefrom.

The above discussion of this invention is directed primarily to preferred embodiments and practices thereof. Further modifications are also possible without departing from the inventive concept. Thus, for example, as indicated above two, three or more catalytic converters may be employed, containing any suitable catalyst for synthesizing ammonia from any hydrogen- and nitrogen-containing feed gas stream at any suitable reaction temperature. Means other than, or in addition to, high pressure steam generators may be used to cool the effluent from the second or any subsequent catalytic converter before feeding this effluent to the next catalytic converter in the sequence, or before feeding the final product effluent to the plant's recovery process section. Other inert diluents, or no inert diluent, may be present. Accordingly, it will be readily apparent to those skilled in the art that still further changes and modifications in the actual implementation of the concepts described herein can readily be made without departing from the spirit and scope of the invention as defined by the following claims.

I claim:

1. In a continuous ammonia synthesis process in which a synthesis gas mixture containing nitrogen and hydrogen is passed sequentially over two or more catalyst beds containing ammonia synthesis catalyst to produce a gaseous effluent from each of said catalyst beds containing ammonia and unreacted nitrogen and hydrogen, the improvement which comprises cooling the gaseous effluent from the first of said catalyst beds, before said effluent enters the second catalyst bed, by heat exchange in a steam superheater to control the temperature of the effluent entering the second catalyst bed to a desired level.

2. A process as recited in claim 1 in which the gaseous effluent is cooled to not more than about 430° C.

3. A process as recited in claim 1 in which the gaseous effluent is cooled to between about 370° C. and about 420° C.

4. A process as recited in claim 1 in which two catalyst beds are employed.

5. A process as recited in claim 1 in which three or more catalyst beds are employed.

6. A process as recited in any one of claims 1-5 in which the steam superheater is in communication with bypass means which regulate the amount of steam passing through the steam superheater to control the temperature of the effluent entering the second catalyst bed to a desired level.

7. A process as recited in any one of claims 1-5 in which the gaseous effluent, prior to being cooled in the steam superheater, undergoes heat exchange with the synthesis gas feed to the first catalyst bed.

8. A process as recited in any one of claims 1-5 in which the gaseous effluent from the second and succeeding catalyst beds is cooled, prior to such effluent being fed to a succeeding catalyst bed, by heat exchange in a high pressure steam generator.

9. A process as recited in claim 6 in which the gaseous effluent, prior to being cooled in the steam superheater, undergoes heat exchange with the synthesis gas feed to the first catalyst bed.

10. A process as recited in claim 9 in which the gaseous effluent from the second and succeeding catalyst beds is cooled, prior to such effluent being fed to a succeeding catalyst bed, by heat exchange in a high pressure steam generator.

* * * * *